(12) United States Patent
Otsuji et al.

(10) Patent No.: US 7,891,320 B2
(45) Date of Patent: Feb. 22, 2011

(54) SHEET FOR PETS (75) Inventors: Kazuya Otsuji, Tokyo (JP); Yasuki Tsutsumi, Tokyo (JP); Jun Yamamoto, Tokyo (JP)

(73) Assignee: Kao Corporation, Tokyo (JP)

( * ) Notice: Subject to any disclaimer, the term of this patent is extended or adjusted under 35 U.S.C. 154(b) by 361 days.

(21) Appl. No.: 12/083,516

(22) PCT Filed: Jun. 27, 2007

(86) PCT No.: PCT/JP2007/062881
§ 371 (c)(1),
(2), (4) Date: Aug. 12, 2008

(87) PCT Pub. No.: WO2008/084565
PCT Pub. Date: Jul. 17, 2008

(65) Prior Publication Data
US 2009/0044756 A1 Feb. 19, 2009

(30) Foreign Application Priority Data
Dec. 27, 2006 (JP) .............................. 2006-350897

(51) Int. Cl.
*A01K 29/00* (2006.01)
*A01K 1/015* (2006.01)

(52) U.S. Cl. ...................... 119/169; 119/171

(58) Field of Classification Search ................ 119/169, 119/171, 166, 167, 170, 172, 173, 168, 165, 119/526; 604/378, 379, 381, 385.01
See application file for complete search history.

(56) References Cited
U.S. PATENT DOCUMENTS 4,935,276 A * 6/1990 Pawlowski et al. ......... 428/35.7
5,209,185 A * 5/1993 Chikazawa ................. 119/171
5,389,202 A * 2/1995 Everhart et al. ............. 162/103
5,579,722 A * 12/1996 Yamamoto et al. .......... 119/169
5,609,123 A * 3/1997 Luke et al. .................. 119/173
5,630,376 A * 5/1997 Ochi et al. .................. 119/169
5,630,377 A * 5/1997 Kumlin ....................... 119/172
5,730,737 A * 3/1998 Widlund et al. ............. 604/378
H1732 H * 6/1998 Johnson ....................... 428/68
5,797,347 A * 8/1998 Ochi ........................... 119/169
5,819,688 A * 10/1998 Walker ....................... 119/169

(Continued)

FOREIGN PATENT DOCUMENTS

JP 9-308403 A 12/1997

(Continued)

*Primary Examiner*—Yvonne R. Abbott
(74) *Attorney, Agent, or Firm*—Birch, Stewart, Kolasch & Birch, LLP (57) ABSTRACT

A pet sheet 1 including a topsheet 2, a backsheet 3, an absorbent core 41 located between the sheets 2 and 3, and a compression molded product 5 of a ground material of plant origin located between the topsheet 2 and the absorbent core 41. The compression molded product 5 is designed to swell and disintegrate upon water absorption. The compression molded product 5 is preferably designed to form a rewet barrier layer between the topsheet 2 and the absorbent core 41 as a result of swelling and disintegration upon water absorption, the rewet barrier layer being formed of water-containing bulky material disintegrated from the compression molded product 5. The compression molded product preferably further contains inorganic powder, particularly zeolite.

7 Claims, 3 Drawing Sheets

U.S. PATENT DOCUMENTS

| | | | | |
|---|---|---|---|---|
| 6,227,145 | B1* | 5/2001 | Miyamoto et al. | 119/172 |
| 6,349,674 | B1* | 2/2002 | Gaese et al. | 119/171 |
| 6,395,957 | B1* | 5/2002 | Chen et al. | 604/381 |
| 6,578,520 | B2* | 6/2003 | Otsuji et al. | 119/165 |
| 6,635,799 | B1* | 10/2003 | Osborn et al. | 604/367 |
| 6,761,955 | B2* | 7/2004 | Mizutani et al. | 428/126 |
| 6,802,281 | B2* | 10/2004 | Otsuji et al. | 119/169 |
| 6,960,702 | B1* | 11/2005 | Kawakami et al. | 604/359 |
| 6,976,451 | B2* | 12/2005 | Helfman | 119/169 |
| 7,249,570 | B1* | 7/2007 | Roberson | 119/169 |
| 7,493,870 | B2* | 2/2009 | Takahashi et al. | 119/171 |
| 7,654,227 | B1* | 2/2010 | Yananton | 119/169 |
| 7,678,221 | B2* | 3/2010 | Takahashi et al. | 156/227 |
| 7,726,260 | B1* | 6/2010 | Yananton | 119/171 |
| 2001/0009142 | A1* | 7/2001 | Otsuji et al. | 119/165 |
| 2003/0116095 | A1* | 6/2003 | Otsuji | 119/165 |
| 2003/0150393 | A1* | 8/2003 | Otsuji et al. | 119/169 |
| 2003/0171726 | A1* | 9/2003 | Onishi et al. | 604/359 |
| 2005/0166855 | A1* | 8/2005 | Kaneko et al. | 119/169 |
| 2005/0166856 | A1* | 8/2005 | Kaneko et al. | 119/169 |
| 2006/0027181 | A1* | 2/2006 | Ikegami et al. | 119/169 |
| 2006/0058750 | A1* | 3/2006 | Di Girolamo et al. | 604/378 |
| 2008/0271679 | A1* | 11/2008 | Kaneko et al. | 119/169 |
| 2009/0000561 | A1* | 1/2009 | Takahashi et al. | 119/171 |
| 2009/0013936 | A1* | 1/2009 | Yamamoto et al. | 119/171 |
| 2009/0038554 | A1* | 2/2009 | Tsutsumi et al. | 119/166 |
| 2009/0114161 | A1* | 5/2009 | Carnahan et al. | 119/169 |
| 2010/0176144 | A1* | 7/2010 | Askinasi | 221/71 |
| 2010/0224133 | A1* | 9/2010 | Hiroshima et al. | 119/169 |

FOREIGN PATENT DOCUMENTS

| | | |
|---|---|---|
| JP | 11-332413 A | 12/1999 |
| JP | 2003-092940 | 4/2003 |
| JP | 3094895 U | 7/2003 |
| JP | 2005-198598 A | 7/2005 |
| WO | WO-2006/080514 A1 | 8/2006 |

* cited by examiner

SHEET FOR PETS

TECHNICAL FIELD

The present invention relates to a sheet for pets that can be used to absorb excreta including urine from pets such as dogs and cats.

BACKGROUND ART

A toilet sheet for pets (hereinafter referred to as a pet sheet or simply a sheet) such as the one disclosed in Patent Document 1 as shown below has been used to absorb excreta including urine from a household pet such as a dog or a cat. The sheet of Patent Document 1 comprises a liquid permeable topsheet, a liquid impermeable backsheet, and a liquid retentive absorbent member such as an absorbent polymer layer interposed between the two sheets. The pet sheet of this type is usually used as placed on a floor so that a pet animal can urinate on the sheet. The urine is absorbed by the absorptivity of the absorbent member. However, when the animal walks on the sheet having absorbed urine, urine is retransmitted from the absorbent member to the topsheet by the body pressure, which is called "rewet".

Apart from use of the toilet sheet of the type described, it is known to use pet litter to absorb pet's excreta. For example, Patent Document 2 as shown below proposes cat litter obtained by heat compressing a ground material comprising softwood sawdust into pellets that self-disintegrate on water absorption. The litter is used as spread over a drainboard to an appropriate thickness. On absorbing urine, the litter disintegrates and drops through the drainboard so that only the wetted part of the litter may be disposed of. However, when a large amount of urine is discharged at a time, although most of the urine is absorbed by the litter, the unabsorbed portion of the urine can fall through the drainboard. Therefore, when used in the cat toilet, the litter should be placed in a considerably large quantity. Besides, there is no concept in Patent Document 2 of incorporating the litter into the above-described pet sheet.

Patent Document 1: JP 2003-92940A
Patent Document 2: JP 9-308403A

DISCLOSURE OF THE INVENTION

The present invention provides a pet sheet having a topsheet, a backsheet, an absorbent core located between the topsheet and the backsheet, and a compression molded product located between the topsheet and the absorbent core. The compression molded product contains a ground material of plant origin and is designed to swell and disintegrate upon water absorption.

The invention also provides a pet toilet system having a toilet box which is partitioned by a drainboard into an upper compartment and a lower compartment. The upper compartment is a housing for putting an excreta treating material. The toilet system contains the above described pet sheet which is put in the lower compartment.

DETAILED DESCRIPTION OF THE INVENTION

Figure 1:
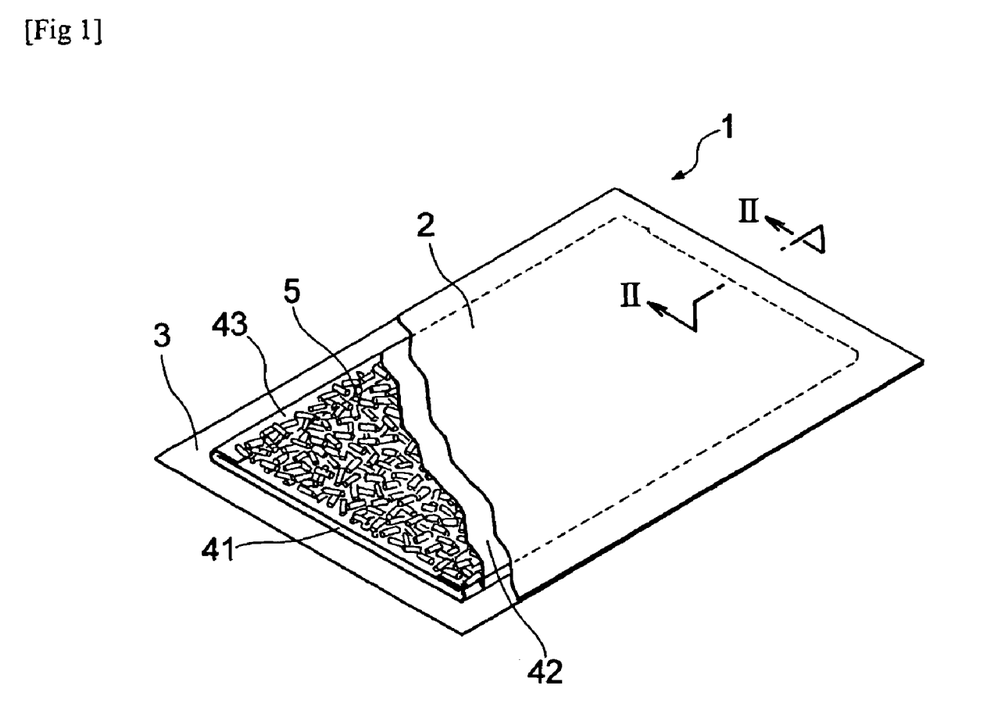
FIG. 1 is a perspective of an embodiment of the pet sheet according to the present invention, with part cut away.
Figure 2:
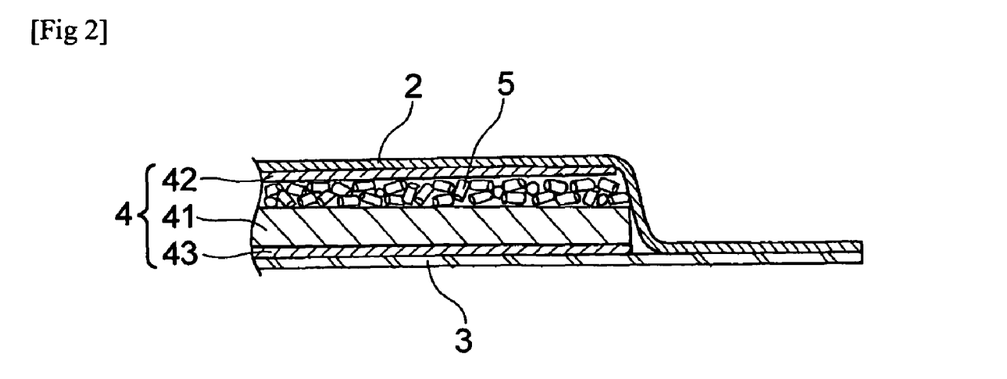
FIG. 2 is a fragmentary cross-section taken along line II-II in FIG. 1.

The present invention will be described based on its preferred embodiments with reference to the accompanying drawing. As illustrated in FIG. 1, a pet sheet 1 of a first preferred embodiment is rectangular in a plan view. As shown in FIGS. 1 and 2, the sheet 1 includes a liquid permeable topsheet 2, a liquid impermeable or water repellent backsheet 3, and a liquid retentive absorbent core 41 interposed between the sheets 2 and 3. The absorbent core 41 constitutes an absorbent member 4 together with an upper cover sheet 42 covering the upper side of the absorbent core 41 and a lower cover sheet 43 covering the lower side of the absorbent core 41. As used herein, the terms "upper side" and "lower side" of a pet sheet constituent member means the side facing a pet animal and the opposite side, respectively. Unless otherwise specified, the terms "longitudinal direction" and "lateral direction" indicate the direction parallel to the longitudinal direction of the pet sheet and the direction parallel to the lateral direction, respectively.

The topsheet 2, the backsheet 3, and the absorbent member 4 are all rectangular, longer than wide, in their plan view. The length and width of the topsheet 2 and backsheet 3 are the same as those of the pet sheet 1. The size of the pet sheet 1 is selected as appropriate to the kind of the pet animal. For example, the pet sheet 1 for dog or cat use may have a length of about 40 to 90 cm and a width of about 30 to 60 cm. The absorbent member 4 is smaller than the topsheet 2 and backsheet 3 in length and width. The topsheet 2 covers the entire upper side of the absorbent member 4 and extends outward from both longitudinal ends and from both lateral side edges of the absorbent member 4.

The backsheet 3 covers the entire lower side of the absorbent member 4 and extends outward from both longitudinal ends and from both lateral side edges of the absorbent member 4. The topsheet 2 and the backsheet 3 are joined together in their extensions outward of the absorbent member 4 by adhesion with, for example, a hot-melt adhesive, heat sealing or ultrasonic sealing.

The topsheet 2 and backsheet 3 can be of any materials that have conventionally been employed in sheets for pets. Any sheet that transmits a liquid toward the absorbent member 4 serves as the topsheet 2. Useful topsheets include woven or nonwoven fabrics made of synthetic or natural fibers and porous sheets. Spun-bonded nonwoven fabric is an example. Another example is air-through nonwoven fabric formed from a carded web of conjugate fibers having a side-by-side configuration or a sheath/core configuration having polyethylene sheath and a polypropylene or polyester core. The nonwoven fabric may be perforated at prescribed positions. A perforated film of a polyolefin, e.g., low-density polyethylene with a large number of small perforations is also preferred because of its high liquid permeability for keeping the surface dry.

Any liquid impermeable or water repellent sheet serves as the backsheet 3. Useful backsheets include film of polymers such as polyethylene, polypropylene, and polyethylene terephthalate. Composite nonwoven fabrics having spunbonded nonwoven (S) and melt-blown nonwoven (M)

stacked in a specific order, such as SM, SMS, and SMMS, are also preferred in view of flexibility or the like.

Figure 3:
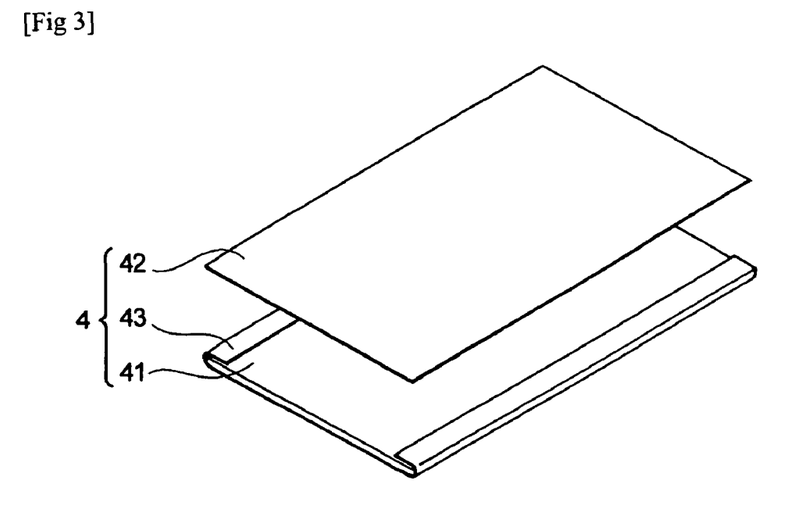
FIG. 3 is an exploded perspective of the absorbent member used in FIG. 1.

As illustrated in FIG. 3, the absorbent member 4 is composed of the absorbent core 41, the upper cover sheet 42 covering the upper side of the absorbent core 41, and the lower cover sheet 43 covering the lower side of the absorbent core 41. The absorbent core 41 is rectangular in a plan view. The upper cover sheet 42 is also rectangular in a plan view and is practically equal in length and width to the absorbent core 41. The lower cover sheet 43 is also rectangular in a plan view and is practically equal in length to the absorbent core 41 but larger in width than the absorbent core 41.

The absorbent core 41 is on the upper side of the lower cover sheet 43 with its longitudinal ends aligned almost with those of the lower cover sheet 43 and with its lateral side edges inboard of those of the lower cover sheet 43. The lateral side portions of the lower cover sheet 43 outboard of the lateral side edges of the absorbent core 41 are folded over the upper side of the stack of the absorbent core 41 and the upper cover sheet 42 and joined to the upper side of the upper cover sheet 42.

The absorbent core 41 is made of a material capable of absorbing and retaining a fluid. For example, an aggregate of hydrophilic fibers such as pulp fiber or a mixture of hydrophilic fiber such as pulp fiber and an absorbent polymer can be used. An absorbent porous material such as sponge may also be used. Examples of the upper cover sheet 42 and the lower cover sheet 43 include paper, nonwoven fabric, tissue paper, composites of these materials, and like absorbent paper.

As illustrated in FIGS. 1 and 2, a compression molded product 5 in the form of columnar pellets is spread between the topsheet 2 and the absorbent core 41 to provide a layer of the compression molded product 5 between the topsheet 2 and the absorbent core 41. The compression molded product 5 contains a ground material of plant origin (hereinafter also referred to as a ground plant). Formed by compaction of a ground plant, the compression molded product 5 starts absorbing immediately on contact with water. It follows that the binding force among the particles constituting the compression molded product 5 is lessened to allow the particles to swell and be relieved from the compressed state until it loses its molded shape and disintegrates into the original state as a ground plant. As a result, a rewet barrier layer is formed in the region having been wetted with urine. By providing a layer of the compression molded product 5 having such a characteristic between the topsheet 2 and the absorbent core 41, the pet sheet 1 of the present embodiment achieves extremely effective performance in rapid absorption, rewet inhibition, and surface dryness retention. The mechanism for this achievement is believed to be as follows.

Immediately after urination by a pet animal, urine having passed through the topsheet 2 is rapidly absorbed totally or partially by the layer of the compression molded product 5. On absorbing urine, the binding force among the particles of the ground plant is weakened in the wetted region to release the particles from compression. On being released from compression, the compression molded product 5 swells. The distance between the particles increases gradually along with the swell and, at last, the compression molded product 5 disintegrates until it loses its molded shape. In the course of the swelling and disintegration, not only are re-generated voids among the particles of the ground plant, but the voids that have originally existed in the individual particles are restored because the individual particles, through the swelling and disintegration, restore their original form before being compressed. As a result, a bulky layer of the water-containing material which is a disintegration product of the compression molded product 5 is created between the topsheet 2 and the absorbent core 41 in the urine-wetted region. This layer is formed of the water-containing particles of a ground plant and contains air to provide high bulkiness. Since the bulky layer of water-containing material has porosity originally possessed by the material of plant origin, it is able to retain urine not only between the particles but also in the individual particles, thereby achieving a high water content. On the other hand, the part of urine that has failed to be absorbed while passing through the layer of the compression molded product 5 quickly reaches the absorbent core 41 of the absorbent member 4. On reaching the absorbent core 41, the urine is quickly absorbed by the absorbent core 41 and spreads in planar directions. After a while, the urine once absorbed by the absorbent core 41 gradually moves to the compression molded product 5 to cause that part of the compression molded product 5 to disintegrate.

The thus formed bulky layer of the water-containing material which is a disintegration product of the compression molded product 5 (hereinafter referred to as "disintegrated material") acts as a rewet barrier layer that blocks rewet. This is because, even if a pet animal walks on the sheet having absorbed urine, the part of the absorbent member having directly received urine and the part having been wetted with planarly spread urine in the absorbent core 41 are covered with the swollen/disintegrated material. The water-containing disintegrated material releases little urine even when pressed by the pet's body pressure so that the absorbed urine is not re-transmitted (rewetted) to the topsheet by the pet's body pressure. This is because the barrier layer contains a great number of voids between the particles of the ground plant by which the particles are parted from one another, so that oozing urine is prevented from moving to the topsheet. This is the same as the phenomenon that sawdust sufficiently spread over a puddle prevents an walker on the puddle from becoming muddy.

The pet sheet 1 of the present embodiment effectively prevents rewet through the mechanism described above. A pet sheet having a conventional absorbent core, for example, a mixture of 100 g/m$^2$ of fluff pulp and 65 g/m$^2$ of a polyacrylate absorbent polymer allows 50% or more of once absorbed urine to return to the topsheet, i.e., causes a rewet phenomenon, when pressed by a weight 100 times as much as the absorbed urine. In contrast, the amount of rewet of the pet sheet of the invention is less than 10% under the same conditions. Since the disintegrated material of the compression molded product 5 forms a bulky layer containing air, the topsheet 2 overlying the layer remains dry for a long period of time after urination. That is, the pet sheet 1 of the present embodiment achieves surface dryness, rapid absorption, and low rewet. Furthermore, the ground plant making up the compression molded product 5 essentially has a deodorizing effect, so that the pet sheet of the present embodiment has an additional effect in preventing the smell of urine from being generated.

Figure 4:
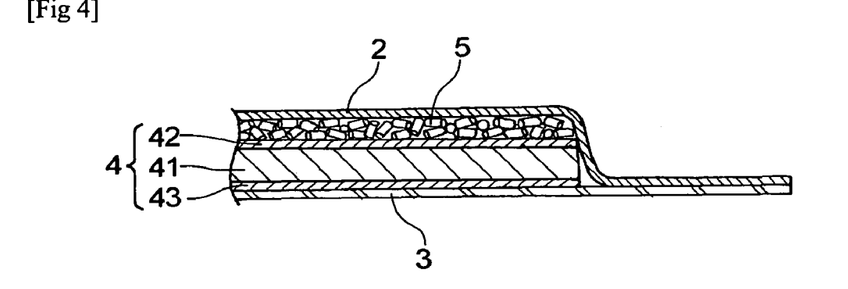
FIG. 4 is a fragmentary cross-section of another embodiment of the pet sheet according to the present invention (corresponding to FIG. 2).

As illustrated in FIGS. 1 and 2, the compression molded product 5 is disposed on the upper side of the absorbent core 41 and covered with the upper cover sheet 42. In other words, the compression molded product 5 is present inside the absorbent member 4. Therefore, fine particles of a ground plant generated as a result of swelling/disintegration of the compression molded product 5 with urine are prevented from scattering by the upper cover sheet 42. In this viewpoint, the present embodiment in which the compression molded product 5 is present inside the absorbent member 4 is particularly preferred. It should be noted, however, that the invention is not limited to the present embodiment. For example, the compression molded product 5 may be disposed on the upper side of the absorbent member 4, i.e. between the upper cover sheet 42 of the absorbent member 4 and the topsheet 2 as illustrated in FIG. 4.

In order to prevent the compression molded product 5 between the topsheet 2 and the absorbent core 41 from being moved and localized during transportation or use of the sheet 1, it is preferred to fix the compression molded product 5 on the absorbent core 41 or the upper cover sheet 42 of the absorbent member 4. Specifically, it is preferred for securing urine passage that the compression molded product 5 is fixed on the absorbent core 41 when provided between the absorbent core 41 and the upper cover sheet 42 or on the upper cover sheet 42 when provided between the upper cover sheet 42 and the topsheet 2. The term "to fix" as used herein implies to fix temporarily rather than to fix firmly. It is only necessary for the compression molded product 5 to be fixed on the absorbent core 41 or the upper cover sheet 42 to such an extent as to prevent extreme localization of the compression molded product 5. In this regard, the fixing is achieved sufficiently with only a small amount of an adhesive. A water-soluble adhesive is preferred for not interfering with the absorbing performance of the compression molded product 5. Use of a small amount of a water-insoluble adhesive is not problematic. For example, an acrylic rubber adhesive is preferred. A preferred amount of the adhesive to be applied is 2 to 20 g/m$^2$.

The material of plant origin that constitutes the compression molded product 5 may be any of herbaceous and woody plants. Examples of the ground material of such plant origin include ground woody plants (ground wood or bark), seed oil cake, ground hull of cereal grains, and ground herbaceous plants. As used herein, the term "ground material" or "ground plant" is intended to widely include materials obtained by mechanically grinding plants such as sawdust and grindings.

It is preferred to use, as a material of plant origin that constitutes the compression molded product 5, one maintaining the character of porosity inherent to a material of plant origin such that the layer of the ground material becomes bulky after swelling and disintegration to prevent rewet. It is particularly preferred to use, as a material of plant origin that constitutes the compression molded product 5, ground chips of softwood such as cedar, pine, and cypress for their moldability and deodorizing performance owing to their deodorizing components such as phenol or terpene substances. The ground plants may be used either individually or as a combination of two or more thereof.

The compression molded product 5 may be made solely of a ground plant or may contain other components. To make the compression molded product 5 solely of a ground plant is advantageous in that accidental ingestion by a pet is of little harm to the pet's health. In the case where the compression molded product 5 contains other components than the ground plant, it is preferred that the ground plant is used in a proportion of 70% to 99.9%, more preferably 85% to 99%, even more preferably 92% to 98%, by weight, in terms of shape retention before use and disintegrability after water absorption.

Components that can be incorporated into the compression molded product 5 other than the ground plant include inorganic powders. A compression molded product 5 made of a mixture of the ground plant and inorganic powder is more effective in preventing rewet. This is because the presence of the inorganic powder in the compression molded product 5 ensures the disintegrability. The presence of the inorganic powder in the compression molded product 5 produces an additional effect of further widening the interstices between plant particles parted by air, which ensures rewet prevention even if the layer of the particles disintegrated from the compression molded product 5 is pressed by a pet to ooze out urine.

Examples of the inorganic powder include bentonite, silica, talc, titanium oxide, calcium carbonate, calcium hydroxide, calcium oxide, white carbon, diatomaceous earth, siliceous white clay, kaolin, zeolite, and sepiolite. These powders can be used either individually or as a combination of two or more thereof. Zeolite is preferred to provide a molded product with good shape retention before use and good disintegrability after water absorption. For the same reason, a preferred proportion of the inorganic powder in the compression molded product 5 is 0.1% to 30%, more preferably 1% to 15%, even more preferably 2% to 8%, by weight.

Porous particles such as zeolite powder are capable of retaining water therein. Use of such porous particles as inorganic powder brings about further improved disintegrability, which leads to further ensured effect on rewet prevention. In addition, use of zeolite and other clay minerals as inorganic powder imparts a deodorizing function to the compression molded product 5.

In particular, when a molding material containing zeolite as inorganic powder and particles of softwood (e.g., cedar, pine, and cypress) having a high content of terpene substances as a ground material of plant origin is compression molded, the components volatilized from the material of plant origin undergo change in composition. As a result, the deodorizing effect of the terpene substances, which are highly deodorant substances, is enhanced.

It is desirable that the compression molded product 5 is porous in terms of shape retention before use, water absorption, and disintegrability after water absorption. The compression molded product 5 preferably has a specific gravity of 0.5 to 1.8, more preferably 0.8 to 1.5, even more preferably 1 to 1.3.

The water absorption, disintegrability after water absorption, and absorption rate of the compression molded product 5 are measured in accordance with the methods described below. In view of deodorizing properties, disintegrability after water absorption, rewet preventing performance, and surface dryness, it is preferred that the absorbency is 15% or higher, more preferably 20% or higher; the dusting ratio be 20% or more, more preferably 30% or more; and the absorption rate be 40 seconds or less, more preferably 20 seconds or less. Such water absorbing and disintegration properties are accomplished by producing the compression molded product 5 by the method described hereunder.

Method of Absorbency Measurement

The compression molded product 5 weighing 70±1 g is put in an 80 mm diameter, 100 mm high cylinder with a net bottom (mesh size: 2.8 mm). The cylinder and contents are immersed in water at 25° C.±3° C. for 3 seconds. After the cylinder is taken out of water, water adhered to the cylinder is wiped up with an absorbent sheet (Kim Towel, a trade name, available from CRECIA; basis weight: 30 g/m$^2$). The contents are transferred into another cylinder and weighed to obtain the weight of the compression molded product 5. A water absorbency (%) of the compression molded product 5 is calculated from the thus measured weight of the compression molded product 5 after water absorption and the weight of the compression molded product 5 before immersion according to formula:

Water absorbency(%)=[(weight of compression molded product after immersion−weight of compression molded product before immersion)/(weight of compression molded product before immersion)]×100

Method of Dusting Ratio Measurement

Following to the above measurement, the compression molded product is transferred to another cylinder of the same shape as the cylinder described above. The transfer of the contents between the two cylinders is repeated 50 times in total. The discrete particles generated as a result of the repetition of transfer operation is collected and weighed. The weight of the collected particles is divided by the weight (g) of the compression molded product before immersion, and the quotient is multiplied by 100 to give a dusting ratio (%) of the compression molded product.

Method of Absorption Rate Measurement

Figure 5:
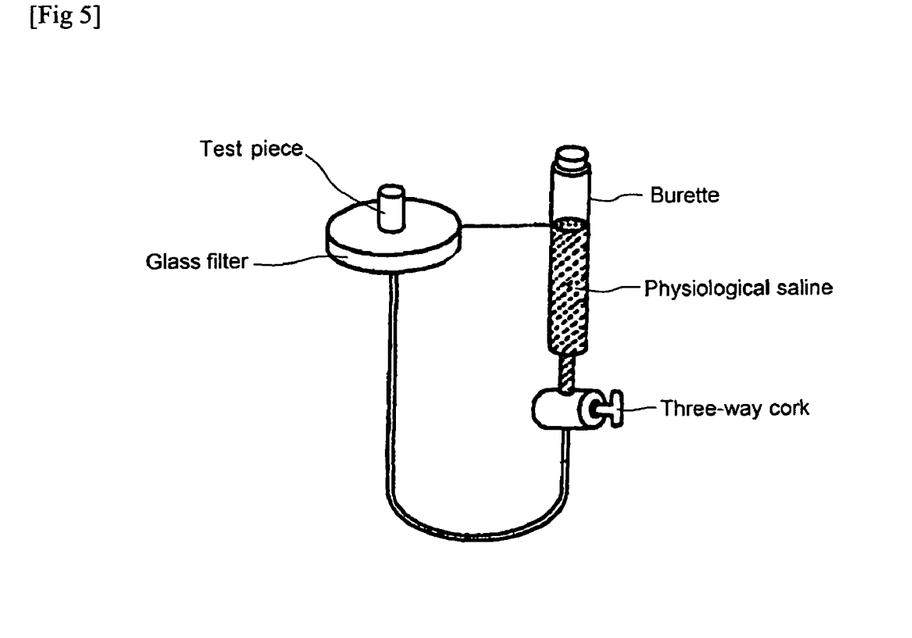
FIG. 5 schematically illustrates a demand wettability tester.

The absorption rate is measured in accordance with the method described below. A demand wettability tester shown in FIG. 5, which is well known as a device for carrying out a demand wettability test, is used. As illustrated in FIG. 5, the compression molded product (chip) weighing 2.0 g is put on the glass filter set on the same level with the liquid level of physiological saline in the burette. The three-way cock is opened to let the chip absorb physiological saline. The time required until bubbling in the burette stops is taken as an absorption rate (sec).

The size of the individual pieces of the compression molded product 5 is not critical in the present embodiment. For use by dogs or cats, the compression molded product 5 is preferably columnar pellets of about 1 to 6 mm in diameter and about 1 to 15 mm in length. In a modified embodiment of the invention, compression molded pieces larger than the recited size may be once produced and then reduced into fragments of the recited size by a mechanical method for use in the pet sheet. In this case, it is important that the compressed state and the above recited dusting ratio, absorbency, and absorption rate are maintained after the larger molded product is mechanically reduced in size by cutting or crushing into the fragments for use in the pet sheet. It is therefore advisable to take some measure according to necessity, for example, to provide a screening step to remove fine dust or to stabilize the size. The fragments thus obtained by mechanical size reduction can also be used as the compression molded product 5. Such fragments of the compression molded product 5 generally have irregular shapes and a large surface area, which helps to temporarily fix the compression molded product 5 as mentioned previously with an adhesive and so on.

The amount of the compression molded product 5 to be used in the pet sheet 1 is decided relative to the amount of the absorbent core 41 to be combined with. Specifically, in the cases where the absorbent core 41 is pulp or a mixture of pulp and an absorbent polymer, the compression molded product 5 is preferably used in an amount of 30 to 250 parts, more preferably 50 to 100 parts, by weight per 100 parts by weight of the absorbent core. The compression molded product 5 is preferably used in an amount of 30 to 200 g/m², more preferably 50 to 130 g/m².

The compression molded product 5 is preferably produced as follows. A ground material of plant origin is thoroughly mixed at the prescribed ratio with inorganic powder if used. The particle size of the ground material is preferably about 0.01 to 5 mm, more preferably about 0.02 to 2 mm, in terms of uniformity of mixing, moldability, disintegrability after water absorption, and deodorizing performance. The particle size of the inorganic powder is preferably about 1 to 20 μm, more preferably about 0.1 to 5 μm, in terms of uniformity of mixing, moldability, and disintegrability after water absorption.

The resulting mixture is press molded by means of a compression extruder in columnar pellet form. A preferred compression extruder is a high pressure extruder including a die having die holes and a pressing roller in contact with the die for pressing the mixture through the holes (e.g., a ring die type pelletizer). Such a high pressure extruder is exemplified by a pelletizer from Sprout Ltd. By using the high pressure extruder, it is possible to press the mixture into the die holes under a high pressure, which allows the die holes to have a large length (depth), and to sufficiently increase the resistance against the inner wall of the die holes. As a result, the mixture is densified by the high extrusion resistance, whereby a compression molded product 5 having a porous structure and with good shape retention before use can be obtained easily. The thus obtained compression molded product 5, being formed by the plant particles bound together only by the extrusion pressing force, loses the binding force among the particles upon water absorption and swells and disintegrates easily. The compression molded product 5 may contain a small amount of a binder as long as it is capable of swelling and disintegrating upon water absorption to form a bulky rewet-barrier layer of water-containing disintegrated particles containing air between the topsheet and the absorbent core.

The pet sheet of the present invention can be used alone to treat excreta from pets or be used as a member of a pet toilet system. A pet toilet system to which the sheet of the present invention is applicable will be described by way of FIG. 6. A pet toilet 100 shown in FIG. 6 has an almost rectangular open-top toilet box 113, a drainboard 114 as a foraminous member partitioning the toilet box 113 into an upper compartment and a lower compartment, and an almost rectangular, shallow tray 116 under the drainboard 114. The drainboard 114 has a great number of drain holes 112. The upper compartment provides a litter housing 121 above the drainboard 114. The tray 116 is removably fitted into the toilet box 113.

Figure 6:
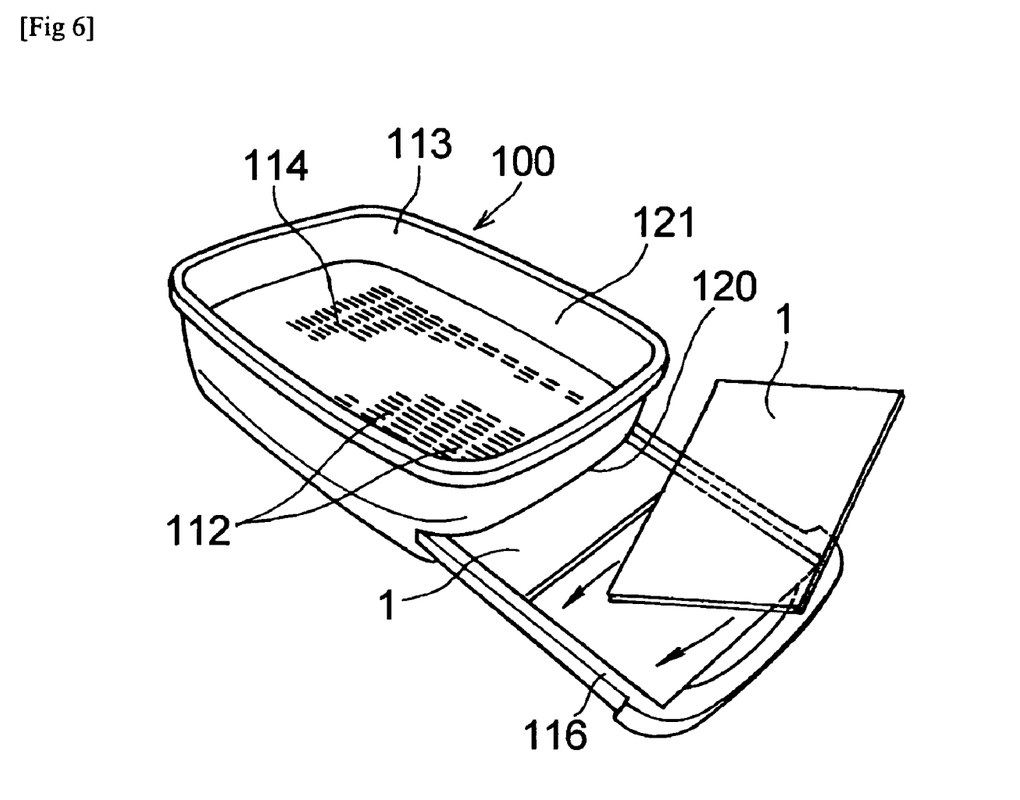
FIG. 6 is a perspective of =a pet toilet having the pet sheet of the present invention.

An excreta treating material (not shown) is put in the litter housing 121, and the sheet 1 described above is placed in the tray 116. The sheet 1 is removably laid in the tray 116 with its topsheet side up and placed in the lower compartment by removably fitting the tray 116 into the toilet box 113. The sheet 1 is configured to absorb urine dropping from the litter housing 121 through the drain holes 112 of the drainboard 114. The whole bottom area of the tray 116 may be covered with a single sheet 1 or two (as shown in FIG. 6) or more contiguous sheets 1.

The toilet box 113 is a molded article of a synthetic resin such as polyethylene (PE), polypropylene (PP), an acrylonitrile-butadiene-styrene copolymer (ABS). The toilet box 113 may have a nearly rounded-rectangular plan measuring, e.g., 200 to 800 mm in length and 150 to 500 mm in width and have a height, e.g., of 100 to 200 mm. The toilet box 113 is partitioned into an upper compartment and a lower compartment by the drainboard 114. The upper space measuring about 40 to 200 mm high from the drainboard provides an open-top litter housing 121, while the lower space measuring about 0 to 40 mm deep from the drainboard provides a tray housing 120 in which the tray 116 is removably fitted.

The excreta treating material that is put in the litter housing 121 is preferably, for example, pellets having a water repellent function. For example, pellets of a molded product containing a ground material of plant origin and a synthetic resin can be used. The molded product preferably has a low water absorbency of 1% to 10% as measured by the method described above. The pellets having such a low absorbency allow discharged pet's urine to swiftly pass therethrough, drop into the lower compartment through the drain holes 112 of the drainboard 114, and be absorbed by the sheet 1 in the tray 116 housed in the lower compartment. A particularly preferred excreta treating material is described in commonly assigned JP 2002-84909A. More specifically, the excreta treating material preferred for use in the present invention are ones of prescribed shape containing 70% to 97% by weight of a ground material of plan origin and 3% to 30% by weight of a synthetic resin, which are obtained by molding a mixture of the ground material of plan origin and the synthetic resin by use of an extruder, and which have a water absorbency of 3% to 10% and sufficient shape retention not to disintegrate upon water absorption.

While the present invention has been described with its preferred embodiments, the invention is not limited to the embodiments described. For example, while the sheet 1 of the above-described embodiments is particularly suited for use by dogs or cats, it is designable for use by smaller or larger animals by appropriately adjusting the size of the sheet 1, the weight per unit area of the absorbent member 4 or the compression molded product 5, and the like.

EXAMPLES

The present invention will now be illustrated in greater detail with reference to Examples, but it should be understood that the invention is not deemed to be limited thereto. Unless otherwise specified, all the percents are given by weight.

Example 1

(1) Preparation of a Compression Molded Product

Sawdust of German spruce having an average particle size of 1.2 mm was molded into pellets by means of a ring die type pelletizer (Sprout Ltd.). The pellets (compression molded product) had a diameter of 2.0 mm and a length of 1 to 10 mm. As a result of water absorption test, the compression molded product was found to have an absorbency of 12.2% and an absorption rate of 40 seconds. The dusting ratio was 17.2%.

(2) Production of a Pet Sheet

A pet sheet 1 having the structure shown in FIGS. 1 to 3 was made. An absorbent member 4 was interposed between a topsheet 2 and a backsheet 3. The compression molded product 5 obtained in (1) above was distributed between the topsheet 2 and the absorbent core 41, i.e., between the upper cover sheet 42 and the absorbent core 41. The compression molded product 5 was adhered to the absorbent core 41 by spraying 7 g/m$^2$ of a synthetic rubber adhesive (55-Spray, from 3M). The topsheet and the backsheet were cut to size to obtain pet sheets of 30 cm by 45 cm. Polypropylene spun-bonded nonwoven fabric having a basis weight of 20 g/m$^2$ was used as the topsheet. Polyethylene film having a basis weight of 30 g/m$^2$ was used as the backsheet. The absorbent member was an absorbent core made of a mixture of 100 g/m$^2$ of fluff pulp and 65 g/m$^2$ of a polyacrylic acid-based absorbent polymer and sandwiched in between a pair of sheets of paper each having a basis weight of 15 g/m$^2$. The compression molded product 5 was put in a layer in an amount of 65 g/m$^2$.

Example 2

Ninety five parts by weight of sawdust of German spruce having an average particle size of 1.2 mm and 5 parts by weight of zeolite having an average particle size of 3 μm were mixed thoroughly. The mixture was extruded into pellets by use of a ring die type pelletizer (from Sprout Ltd.). The resulting compression molded product had a diameter of 2.0 mm and a length of 1 to 10 mm. As a result of water absorption test, the compression molded product was found to have an absorbency of 30.3% and an absorption rate of 10 seconds. The dusting ratio was 46.8%. A pet sheet was obtained in the same manner as in Example 1 except using the resulting compression molded product.

Comparative Example 1

A pet sheet was produced in the same manner as in Example 1, except that the compression molded product 5 was not disposed between the topsheet 2 and the absorbent member 4.

Evaluation

The pet sheets obtained in Examples 1 and 2 and Comparative Example 1 were evaluated for rewet prevention as follows. As a result, the amount of rewet was 1.3 g in Example 1 and 0.7 g in Example 2, while that in Comparative Example 1 was 13.0 g, that is larger amount than those of Examples 1 and 2.

Measurement of Amount of Rewet

Twenty grams of physiological saline was dropped on the pet sheet at spots by means of a pipette. Ten seconds after completion of the dropping, a 4 cm by 4 cm sheet of filter paper, the weight of which had previously been measured, was placed on the wetted part of the sheet, and a 2 kg weight was put thereon and allowed to stand for 10 seconds. The weight was removed, and the filter paper was weighed. The difference in weight of the filter paper between before and after the absorption was taken as the amount of rewet.

INDUSTRIAL APPLICABILITY

As described above in detail, the pet sheet of the present invention has a compression molded product of a ground material of plant origin located between the topsheet and the absorbent core thereof. On urine absorption, the compression molded product swells and disintegrates to form a rewet barrier layer between the topsheet and the absorbent core, by which rewet is effectively prevented. That is, by a small amount of the compression molded product, the pet sheet of the present invention achieves extremely effective performance in rapid absorption, rewet inhibition, and surface dryness retention with appropriate amount of the compression molded product combined with the absorbent core. The ground material of plant origin making up the compression molded product essentially has a deodorizing effect, so that the pet sheet has an additional effect in preventing generation of smell of urine.

The invention claimed is:

1. A pet sheet comprising a topsheet, a backsheet, an absorbent core located between the topsheet and the backsheet, and a compression molded product located between the topsheet and the absorbent core, the compression molded product containing a ground material of plant origin and being designed to swell and disintegrate upon water absorption.

2. The pet sheet according to claim 1, wherein the compression molded product is designed to form a rewet barrier layer between the topsheet and the absorbent core as a result of swelling and disintegration upon water absorption, the rewet barrier layer comprising a water-containing bulky material which is a disintegration product of the compression molded product and contains air.

3. The pet sheet according to claim 1, wherein the absorbent core is covered with a cover sheet to form an absorbent member, and the compression molded product is located between the absorbent core and the cover sheet.

4. The pet sheet according to claim 1, wherein the compression molded product further contains inorganic powder.

5. The pet sheet according to claim 4, wherein the inorganic powder is zeolite.

6. The pet sheet according to claim 1, which is for use in a pet toilet system comprising a toilet box and a drainboard partitioning the toilet box into upper and lower compartments, the upper compartment being a housing for putting an excreta treating material, the pet sheet being configured to be placed in the lower compartment.

7. A pet toilet system comprising a toilet box, a drainboard partitioning the toilet box into upper and lower compartments, the upper compartment being a housing for putting an excreta treating material, and the pet sheet according to claim 1 being put in the lower compartment.

\* \* \* \* \*